United States Patent [19]
> Takahashi et al.

[11] 3,755,309

[45] Aug. 28, 1973

[54] 2-SUBSTITUTED PYRIDINE DERIVATIVES AND SYNTHESIS THEREOF

[76] Inventors: Tohru Takahashi; Hachiro Sugimoto; Koichiro Ueda, all of Tokyo, Japan

[22] Filed: Nov. 11, 1971

[21] Appl. No.: 197,937

[30] Foreign Application Priority Data
July 16, 1971 Japan.............................. 46/52412

[52] U.S. Cl......... 260/240 J, 424/263, 260/294.8 R, 260/295 R, 260/296 R
[51] Int. Cl............................................. C07d 31/44
[58] Field of Search..................... 260/240 J, 295 R, 260/294.8 R, 239 BC, 268 H, 268 C

[56] References Cited
UNITED STATES PATENTS

| | | | |
|---|---|---|---|
| 3,098,066 | 7/1963 | Mull | 260/239 BC |
| 3,448,192 | 6/1969 | Mauvernay | 260/268 H X |
| 3,511,840 | 5/1970 | Tesoro | 260/239 BC X |

*Primary Examiner*—John D. Randolph
*Attorney*—E. F. Wenderoth, Michael R. Davis et al.

[57] ABSTRACT

2-[$\beta$-(N-acylhomopiperazino) pyridines, the new compound, as well as their salts of pharmacologically acceptable acids and the synthesis thereof. The compounds possess excellent antalgic, anti-phlogistic and anti-edematous effects with low toxicity and so are suitable as medicament. They are orally or parenterally administered to the patients.

9 Claims, No Drawings

2-SUBSTITUTED PYRIDINE DERIVATIVES AND SYNTHESIS THEREOF

This invention relates to the new 2-substituted pyridine derivatives useful as medicament. More particularly, the present invention concerns with 2-[β-(N-acylhomopiperazino)ethyl]pyridines represented by the formula

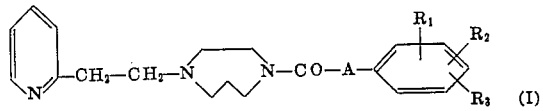

wherein $R_1$, $R_2$ and $R_3$ are respectively hydrogen atom or a substituent selected from the group consisting of halogen, methyl, methoxy, nitro and methane-fulfonyl and A represents a direct union or vinylene bridge; as well as their salts of pharmacologically acceptable acids and synthetic preparation thereof.

It has been found that the new compounds of the aforementioned formula (I) and salts thereof exhibit various pharmacological activities and among others excellent antalgic, anti-phlogistic and anti-edematous effects.

As the pharmacologically acceptable acid salts of the compounds reprented by the formula (I), there may be mentioned their mineral acid salts such as hydrochloride, sulfate and nitrate as well as their organic acid salts such as tartrate, citrate, succinate and methane-sulfonate.

Outstanding anti-edematous effect of 2-{β-[N-(p-chlorocinnamoyl)homopiperazino]ethyl} pyridine hydrochloride, the compound (I′) which is within the coverage of the aforementioned general formula (I), wherein $R_1$ is p-Cl, $R_2$ and $R_3$ are hydrogen and A is vinylene bridge, —CH=CH—, has been observed in the test on rats, wherein edema was induced by the injection of carrageenin. The anti-edematous effect of the compound (I′) was evaluated in comparison with that of aspirin, the latter having been usually employed as standard for evaluation of anti-phlogistic and anti-edematous effects represented by a substance under test. The aqueous suspensions of the compound (I′) and of aspirin in the amounts given in the hereinundermentioned Table were prepared by suspending them in a 5 percent aqueous solution of gum arabic. The suspensions were orally administered to the rats one our before the carrageenin injection.

As control, the 5 percent aqueous solution of gum arabic alone was also administered to another group of rats.

The results observed are given in Table.

TABLE

Anti-edematous effect (Growth-inhibition of edema caused by carrageenin)

| Compound under Test | Oral dose of 20 mg/kg b.w. | Oral dose of 100 mg/kg b.w. |
|---|---|---|
| Aspirin: | almost nothing | 25 % |
| Compound (I′): | 21 % | 46 % |
| Control (only with the 5% gum arabic a.q. sol'n) | 0 % | 0 % |

The figures in Table respectively show the levels in per cent (%) of anti-edematous effects of the compounds as compared with that of the control.

From the Figures, it is seen that even though the oral administration of such a small amount of the compound (I′), there was obtained an appreciable anti-edematous effect and furthermore that with the oral administration of 100 mg/kg b.w. of said compound, there was obtained approximately twice inhibition effect of that of aspirin.

Incidentally, it was known that administration of aspirin is liable to cause serious side-effect on the digestive organs and that such side-effect is particularly enhanced when an excess amount is administered for an elongated period of time to cause gastritis which occasionally leads to gastric ulcer.

In contrast to the above, it has been found that administration of the compounds of the present invention do not cause any injurious side-effect on digestive organs.

It was further found that the compounds of the present invention did not show any serious side-effect on central nervous system, contrary to phenylbutazone and indomethacine, for example, which at present are broadly employed as anti-phlogistic and anti-edematous agents.

The compounds of the present invention may be provided in a form of powdery and liquid medicines, tablets and capsules for oral administration and in a form of parenteral administration such as ampoules for injection and suppository.

It was found that 50–150 mg/day of the compounds of the present invention may orally be administered without any serious side-effect. Of course, the amount of dose may be altered depending upon the symptom of dieseases to be treated.

As is explained in the above, the primary object of the present invention is to provide a useful medicament possessing excellent anti-phlogistic and anti-edematous effects without any serious side-effect.

The chemical reaction which takes place in carrying out the synthetic preparation of the particular compounds according to the present invention may be explained by the following schematic chemical equation:

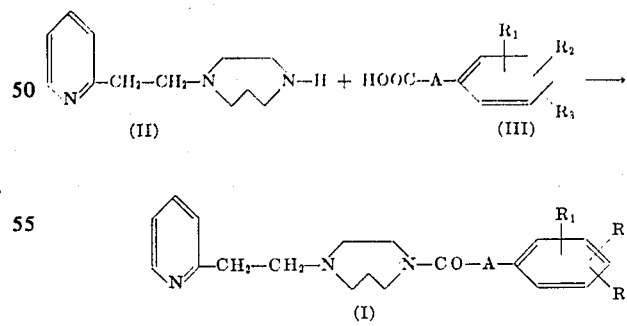

wherein A, $R_1$, $R_2$ and $R_3$ have the same meanings as those aforementioned.

In practice of the above reaction, 2-(β-homopiperazinoethyl)pyridine (II) is reacted with a carboxylic acid (III) or a functional acid derivative thereof such as acid anhydride and halide preferably acid chloride in an inert organic solvent to produce the contemplated compound (I). The reaction can smoothly be effected in the presence of an alkaline condensing agent such as caustic alkali, alkali bicarbonate, triethylamine, etc. The resulting reaction product recovered from the reaction mixture may be purified by recrystallization from a conventional organic solvent such as methanol, ethanol, isopropanol, ether and acetone as well as a mixture thereof.

The resulting product, if desired, may be converted into salt by treating it with a pharmacologically acceptable inorganic or organic acid in accordance with a usual manner.

The following Examples will serve to illustrate the invention.

EXAMPLE 1

Synthetic preparation of 2-{β-[N-(o-chlorobenzoyl)homopiperazino]ethyl} pyridine To 40 ml of an acetone solution containing 3.5 grams (0.02 mol.) of o-chlorobenzoyl chloride and 1 gram of potassium bicarbonate were added drop by drop with stirring under ice-cooling 20 ml of an acetone solution which contained 4.1 grams (0.02 mol.) of 2-(β-homopiperazinoethyl)pyridine. When the addition was over, the whole was refluxed on a boiling water bath for about 2 hours to complete the reaction. After removal of a minute amount of the solid substances essentially consisting of potassium chloride separated out in the reaction system was removed by filtration, and the filtrate was evaporated out. The residue was again dissolved in 50 ml of dry acetone and sufficient quantity of dry hydrogen chloride was passed through the solution in order to convert the basic product into hydrochloride thereof. The acetone was stripped out and the residue was recrystallized from a mixture of isopropanol and ether. There was thus obtained the hydrochloride having the melting point of 183°–186°C. Yield of the product was 5.7 grams corresponding to 75.2 percent of the theory.

Elementary analysis of the product as $C_{19}H_{22}ClN_3O \cdot HCl$ gave:

|  | C | H | N |
|---|---|---|---|
| Found (%): | 59.97 | 6.19 | 11.30 |
| Calculated (%): | 59.55 | 6.11 | 11.05 |

EXAMPLE 2

Synthetic preparation of 2-{β-[N-(p-chlorocinnamoyl)homopiperazino]ethyl} pyridine 3.3 Grams (0.017 mol.) of p-chlorocinnamoyl chloride and 3.1 grams (0.015 mol.) of 2-(β-homopiperazinoethyl)-pyridine were subjected to reaction and the reaction product was further worked up in accordance with the procedures disclosed in Example 1. Crude hydrochloride of the product was recrystallized from a mixture of isopropanol and methanol. 5.2 Grams of the purified product having the melting point of 192°–194°C. were thus obtained. Yield of the product was 81.3 perecnt of the theory.

Elementary analysis of the product as $C_{12}H_{24}ClN_3O \cdot HCl$ gave:

|  | C | H | N |
|---|---|---|---|
| Found (%): | 61.77 | 6.20 | 10.16 |
| Calcualted (%): | 62.06 | 6.21 | 10.34 |

EXAMPLE 3

Synthetic preparation of 2-{β-[N-(p-methane-sulfonylbenzoyl)-homopiperazino]ethyl}pyridine 3.3 Grams (0.015 mol.) of p-methanesulfonylbenzoyl chloride and 3.1 grams (0.015 mol.) of 2-(β-homopiperazinoethyl)pyridine were subjected to reaction and the reaction product was further worked up in accordance with the procedures disclosed in Example 1. After recrystallization from a mixture of methanol and ethanol, there was obtained 4.92 grams of the purified product as hydrochloride melting at 203°–205°C., which corresponds to 78.3 percent of the theoretical yield.

Elementary analysis of the product as $C_{20}H_{25}N_3SO_3 \cdot HCl$ gave:

|  | C | H | N |
|---|---|---|---|
| Found (%): | 56.38 | 6.17 | 10.08 |
| Calculated (%): | 56.65 | 6.19 | 9.91 |

EXAMPLE 4

Synthetic preparation of 2-{β-[N-(3,5-dichlorobenzoyl)homopiperazino]ethyl} pyridine 3,5-Dichlorobenzoyl chloride and 2-(β-homopiperazinoethyl)pyridine in equimolar proportions were subjected to reaction and the reaction product was further worked up in accordance with the manners disclosed in Example 1. There was obtained the contemplated compound as hydrochloride thereof having the melting point of 168°–170°C.

Elementary analysis of the product as $C_{19}H_{21}Cl_2N_3O \cdot HCl \cdot \frac{1}{2}H_2O$ gave:

|  | C | H | N |
|---|---|---|---|
| Found (%): | 54.31 | 5.61 | 10.18 |
| Calculated (%): | 54.10 | 5.43 | 9.93 |

EXAMPLE 5

Synthetic preparation of 2-{β-[N-(o-methylbenzoyl)homopiperazino]ethyl} pyridine o-Methylbenzoyl chloride and 2-(β-homopiperazinoethyl)-pyridine in equimolar proportions were subjected to the reaction and the reaction product was further worked up in accordance with the manner disclosed in Example 1.

There was obtained the contemplated product as hydrochloride having the melting point of 187°–189°C.

Elementary analysis of the resulting product as $C_{20}H_{25}N_3O \cdot HCl$ gave:

|  | C | H | N |
|---|---|---|---|
| Found (%): | 66.37 | 7.28 | 11.67 |
| Calculated (%): | 66.73 | 7.30 | 11.68 |

EXAMPLE 6

Synthetic preparation of 2-{β-[N-(3,4,5-trimethoxybenzoyl)-homopiperazino]ethyl} pyridine 3,4,5-Trimethoxybenzoyl chloride and 2-(β-homopiperazinoethyl)pyridine in equimolar proportions were subjected to reaction and the reaction product was further worked up in accordance with the procedures disclosed in Example 1.

There was obtained the contemplated compound as hydrochloride having the melting point of 171°–173°C.

Elementary analysis of the product as $C_{22}H_{29}N_3O_4 \cdot HCl$ gave:

|  | C | H | N |
|---|---|---|---|
| Found (%) | 60.01 | 7.15 | 9.70 |
| Calculated (%): | 60.60 | 6.95 | 9.64 |

EXAMPLE 7

Synthetic preparation of 2-{ β-[N-(cinnamoyl)homopiperazino]-ethyl}pyridine

Cinnamoyl chloride and 2-(β-homopiperazinoethyl)-pyridine in equimolar proportions were subjected to reaction and the reaction product was further worked up in accordance with the procedures disclosed in Example 1.

There was obtained the contemplated product as hydrochloride having the melting point of 163°–165°C.

Elementary analysis of the product as $C_{21}H_{25}N_3O \cdot HCl$ gave:

|  | C | H | N |
|---|---|---|---|
| Found (%): | 67.33 | 7.11 | 11.47 |
| Calculated (%): | 67.81 | 7.06 | 11.30 |

EXAMPLE 8

Synthetic preparation of 2-{ β-[N-(p-nitrobenzoyl)homopiperazino]-ethyl} pyridine p-Nitrobenzoyl chloride and 2-(β-homopiperazinoethyl)-pyridine in equimolar proportions were subjected to reaction and the resulting reaction product was further worked up in accordance with the procedures disclosed in Example 1.

There was obtained the contemplated product as hydrochloride having the melting point of 203°–205°C.

Elementary analysis of the product as $C_{19}H_{22}N_4O_3 \cdot HCl \cdot \tfrac{1}{2}H_2O$ gave:

|  | C | H | N |
|---|---|---|---|
| Found (%): | 57.30 | 5.87 | 14.33 |
| Calculated (%): | 57.06 | 6.06 | 14.01 |

EXAMPLE 9

Preparation of tablets for oral administration

200 Grams of 2-{ β[N-(p-chlorocinnamoyl)homopiperazino]-ethyl } pyridine hydrochloride were well mixed with 2,000 grams of lactose. The resulting mixture was sifted through a 30 mesh sieve.

Separately, 80 grams of corn starch were kneaded with 300 ml of distilled water to a paste.

The above sifted powdery mixture was well blended with the paste. The resulting blend was again sifted through a 4 mesh sieve to obtain nodules which were dried at the temperature of 50°C. for 15 hours. The dried nodules were treated on a granulating machine and then sifted through a 16 mesh sieve.

The resulting granules were coated with a mixture which consists of 30 grams of calcium stearate, 200 grams of corn starch and 80 grams of talc and previously sifted through a 40 mesh sieve. Tablets each containing 10 mg of the said hydrochloride as active ingredient were made of the coated granules.

2–3 Tablets thus obtained may orally be administered 2–3 times a day.

EXAMPLE 10

Preparation of an aqueous solution for injection

100 Grams of 2-{ β-[N-(p-chlorocinnamoyl)homopiperazino]-ethyl } pyridine hydrochloride were dissolved into distilled water specifically prepared for injection. The resulting solution was made up to 5 liters with additional distilled water. With addition of a predetermined quantity of physiological soline, the solution was made isotonic and then filtered through a glass filter. The filtrate was filled in ampoules each containing 10 mg of the active ingredient, sealed and sterilized at 121°C. in an autoclave at 15 lbs/in² for 25 minutes.

1–2 Ampoules may daily be intravenously injected for therapeutical treatment.

EXAMPLE 11

Preparation of liquid for oral administration

The concentration of the following formulation was prepared:

| | |
|---|---|
| 2-{ β-[N-(p-Chlorocinnamoyl)homopiperazino]-ethyl } pyridine hydrochloride | 20.0 grams |
| Purified cane sugar | 100.0 grams |
| Glycerol | 100.0 ml |
| Synthetic orange essence | 0.2 ml |
| Natural orange essence | 1.0 ml |

The resulting concentrate was diluted with distilled water to make up the total of 1,000 mls. The whole was filtered to obtain the filtrate ready for use.

The liquid medicine thus obtained may orally be administered with shaking 2–4 tea-spoonful a day.

What is claimed is:

1. 2-[β-(N-Acylhomopiperazino)ethyl]pyridine represented by the formula

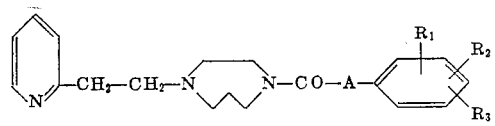

wherein $R_1$, $R_2$ and $R_3$ respectively are hydrogen or a substituent selected from the group consisting of halogen, methyl, methoxy, nitro and methane-sulfonyl; and A represents a direct union or vinylene bridge as well as the pharmacologically acceptable acid salts thereof.

2. The compound according to claim 1, namely 2-{ β-[N-(0-Chlorobenzoyl)homopiperazino]ethyl} pyridine or its pharmacologically acceptable acid salt.

3. The compound according to claim 1, namely 2-{ β-[N-(p-Chlorocinnamoyl)homopiperazino]ethyl } pyridine or its pharmacologically acceptable acid salt.

4. The compound according to claim 1, namely 2-{β-[N-(p-methane-sulfonylbenzoyl)-homopiperazino]ethyl} pyridine or its pharmacologically acceptable acid salt.

5. The compound according to claim 1, namely 2-{ β-[N-(3,5-Dichlorobenzoyl)homopiperazino]ethyl} pyridine or its pharmacologically acceptable acid salt.

6. The compound according to claim 1, namely 2-{β-[N-(0-Methylbenzoly)homopiperazino]ethyl} pyridine or its pharmacologically acceptable acid salt.

7. The compound according to claim 1, namely 2-{β-[N-(3,4,5-Trimethoxybenzoyl)- homopiperazino]ethyl} pyridine or its pharmacologically acceptable acid salt.

8. The compound according to claim 1, namely 2-{β-[N-(Cinnamoyl)homopiperazino]ethyl} pyridine or its pharmacologically acceptable acid salt.

9. The compound according to claim 1, namely 2-{β-[N-'p-Nitrobenzoyl)homopiperazino]ethyl} pyridine or its pharmacologically acceptable acid salt.

* * * * *